United States Patent
Oya et al.

(10) Patent No.: US 7,113,168 B2
(45) Date of Patent: Sep. 26, 2006

(54) COMPACT INFORMATION TERMINAL APPARATUS, METHOD FOR CONTROLLING SUCH APPARATUS AND MEDIUM

(75) Inventors: Takashi Oya, Kanagawa (JP); Yuichi Bannai, Tokyo (JP); Takahiro Kurosawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 596 days.

(21) Appl. No.: 09/948,633

(22) Filed: Sep. 10, 2001

(65) Prior Publication Data

US 2002/0059217 A1    May 16, 2002

(30) Foreign Application Priority Data

Sep. 12, 2000  (JP)  ............................. 2000-277338
Sep. 12, 2000  (JP)  ............................. 2000-277339

(51) Int. Cl.
   *G09G 5/08*   (2006.01)
(52) U.S. Cl. ...................... 345/157; 715/808
(58) Field of Classification Search ............... 345/156, 345/157, 161, 163, 168, 173, 738, 739, 788, 345/805, 808, 810, 815, 819, 820; 200/5 A, 200/6 A; 715/808–810, 812, 828, 841
   See application file for complete search history.

(56) References Cited

U.S. PATENT DOCUMENTS

| | | | | |
|---|---|---|---|---|
| 4,686,522 A | * | 8/1987 | Hernandez et al. | ......... 345/160 |
| 4,987,411 A | | 1/1991 | Ishigami | ................... 340/709 |
| 5,252,952 A | * | 10/1993 | Frank et al. | ................ 345/157 |
| 5,430,262 A | * | 7/1995 | Matsui et al. | ............... 200/5 A |
| 5,563,631 A | | 10/1996 | Masunaga | ................... 345/169 |
| 5,621,196 A | * | 4/1997 | Nishijima et al. | .......... 200/6 A |
| 5,644,737 A | * | 7/1997 | Tuniman et al. | ............ 345/810 |
| 5,664,133 A | | 9/1997 | Malamud et al. | ........... 345/352 |
| 5,877,765 A | * | 3/1999 | Dickman et al. | ........... 715/738 |
| 5,883,626 A | * | 3/1999 | Glaser et al. | ............... 345/788 |
| 5,894,573 A | | 4/1999 | Fukasawa et al. | |
| 5,914,714 A | * | 6/1999 | Brown | ....................... 345/866 |
| 5,917,491 A | * | 6/1999 | Bauersfeld | .................. 345/810 |
| 5,923,326 A | * | 7/1999 | Bittinger et al. | ............ 345/805 |
| 5,982,370 A | | 11/1999 | Kamper | ...................... 345/356 |
| 6,061,060 A | | 5/2000 | Berry et al. | ................ 345/340 |
| 6,219,028 B1 | * | 4/2001 | Simonson | ................... 715/862 |
| 6,246,019 B1 | * | 6/2001 | Nakamura et al. | ......... 200/6 A |
| 6,476,827 B1 | * | 11/2002 | Porter | ........................ 345/738 |

(Continued)

FOREIGN PATENT DOCUMENTS

EP    0 946 028 A2    9/1999

(Continued)

OTHER PUBLICATIONS

"Netscape & WWW" Softbank Books, Printed in Japan ISBN4-89052-849-0, Paul E. Hoffman.

(Continued)

*Primary Examiner*—Xiao Wu
(74) *Attorney, Agent, or Firm*—Fitzpatrick, Cella, Harper & Scinto.

(57) ABSTRACT

In a compact information terminal apparatus including display means having a displaying function equivalent to that of a personal computer, a browser for browsing a hyper text can easily be manipulated without altering the hyper text formed for the personal computer. When a position other than a hot spot of the hyper text on a browsing view is designated by using a position designating input device which can be manipulated by one hand, a group of operation buttons of the browser for the hyper text is displayed in the vicinity of a designated position.

22 Claims, 11 Drawing Sheets

U.S. PATENT DOCUMENTS

2003/0011638 A1* 1/2003 Chung .................. 345/808

FOREIGN PATENT DOCUMENTS

| JP | 11-175258 | 7/1999 |
|---|---|---|
| JP | 2000-36856 A | 2/2000 |

OTHER PUBLICATIONS

"Stationary Cursor Inside A Popup Menu" IBM Technical Disclosure Bulletin, IBM Corp., New York, U.S., vol. 39, No. 5, May 1, 1996.

* cited by examiner

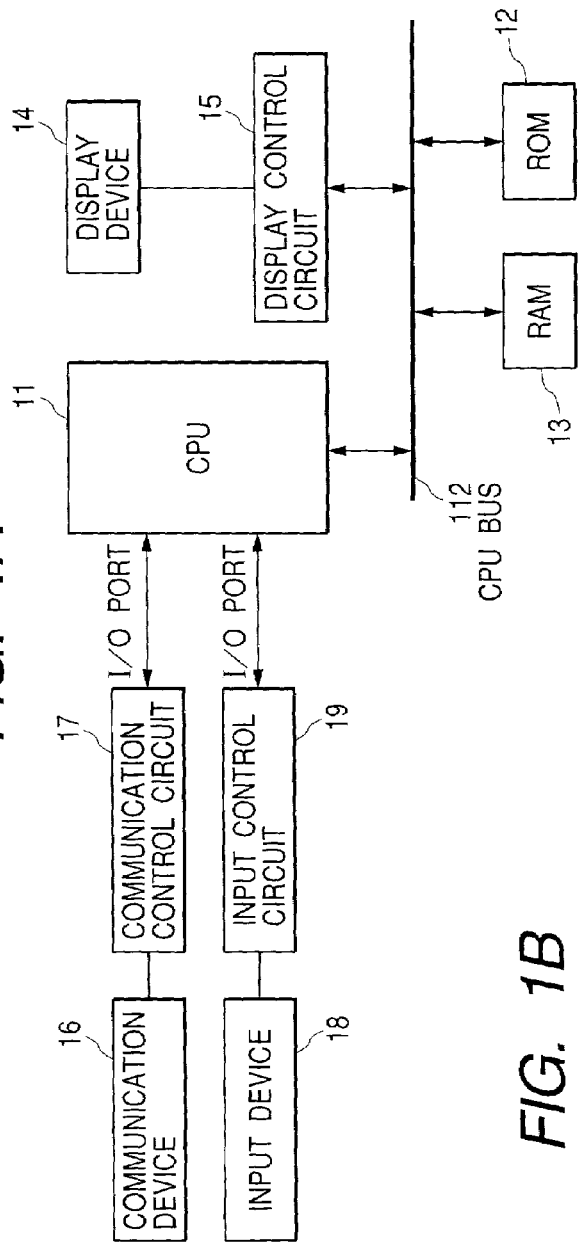
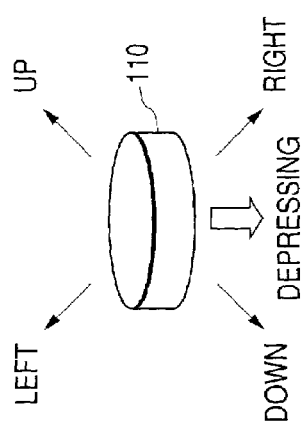

COMPACT INFORMATION TERMINAL APPARATUS, METHOD FOR CONTROLLING SUCH APPARATUS AND MEDIUM

BACKGROUND OF THE INVENTION

1. Field of the Invention

The present invention relates to a compact information terminal apparatus in which a hyper text such as an HTML (hyper text markup language) document can be inspected or browsed by connecting the apparatus to a network such as an Internet.

2. Related Background Art

As an inputting system for portable compact information terminals, a system in which a liquid crystal display device of touch panel type is provided in PDA (personal digital assistants) and the like and an operation is effected through pen input, and a system in which a compact liquid crystal is provided in a cellular phone and the like and an operation is effected by using up-and-down and left-and-right direction input switches are already known.

The inputting system using the touch panel has characteristics that a position can be designated directly by a pen device and a hand-writing character can be inputted. On the other hand, the inputting system using the direction switches has characteristics that it can be manipulated by one hand and the operation can easily be effected by using an instruction input system mainly including a text menu.

Further, it is general to browse the HTML document by effecting access to a WWW (world wide web) server through the Internet. The HTML document permits insertion of a character, image, figure and voice and can be linked to other document by describing tag called as anchor with text. An area described by the anchor tag is called as an anchor spot or a hot spot in browser (inspection software).

Further, the HTML is generally formed to be browsed by a personal computer having a resolving power greater than VGA (video graphics array) (640×480 pixels). Although cellular phones capable of drowsing the HTML document have remarkably been progressed, since a display of the cellular phone has a resolving power lower than that of the personal computer, layout must be devised.

There is no conventional information terminal in which portability and compactness permitting one hand manipulation and displaying ability equivalent to that of the personal computer are compatible. Thus, also regarding the browser for the HTML document, there is no browser having GUI (graphical user interface) suitable for such device. To the contrary, an information terminal according to the present invention has a resolving power of a display equivalent to that of a personal computer and is designed as a compact information terminal capable of being manipulated by one hand.

Although the browser for the personal computer generally has the GUI (graphical user interface) as shown in FIG. 9, since a menu and buttons are arranged end zones of a picture plane (view), when selection is effected, a cursor must be shifted toward the end of the picture plane, and, depending upon the input device, it takes a relatively long term to shift the cursor.

For example, in the inputting method using the direction input switches, although manipulation can be effected by one hand, since input is permitted only in the shifting direction of the cursor, it is impossible to designate an absolute position on the picture plane. As a result, in the browser such as WWW browser for the HTML document, for example, whenever a scrolling operation is performed, the cursor must be shifted greatly up to the desired button.

Further, regarding the input device, when the touch panel is used among the conventional operating systems, since the touch panel must be held by one hand and the touch panel must be touched by a pen held by the other hand, such device cannot be manipulated only by one hand.

For example, an example of the portable information terminal of touch panel type is disclosed in Japanese Patent Application Laid-open No. 11-175258 "Method and apparatus for using touch view display for portable communication device of intelligent type"). However, GUI of this example is similar to that of the personal computer, and it is difficult to perform the software operation by one hand.

Further, another example of the information terminal of a cellular phone type is disclosed in Japanese Patent Application Laid-open No. 2000-036856 ("Context sensing pop-up window for cellular phone"). However, since such a terminal generally has a display view smaller than that of the personal computer, layout of the HTML document must be devised.

SUMMARY OF THE INVENTION

The present invention is made in consideration of the above-mentioned back ground, and an object of the present invention is to permit easy operation of browser for inspecting a hyper text without altering the hyper text formed for a personal computer in a compact information terminal apparatus including display means having a function equivalent to that of the personal computer.

According to one aspect of the present invention, there is provided a compact information terminal apparatus having browsing means for browsing a hyper text, comprising position designating means for designating a position on a display view, and display control means for displaying a list of instructions for operating the browsing means in the vicinity of a designated position when a position other than a hot spot position of the hyper text on the browsing view is designated.

BRIEF DESCRIPTION OF THE DRAWINGS

FIGS. 1A and 1B are block diagrams showing a schematic construction of hardware of a compact information terminal apparatus to which the present invention is applied;

DESCRIPTION OF THE PREFERRED EMBODIMENTS

Figure 2:
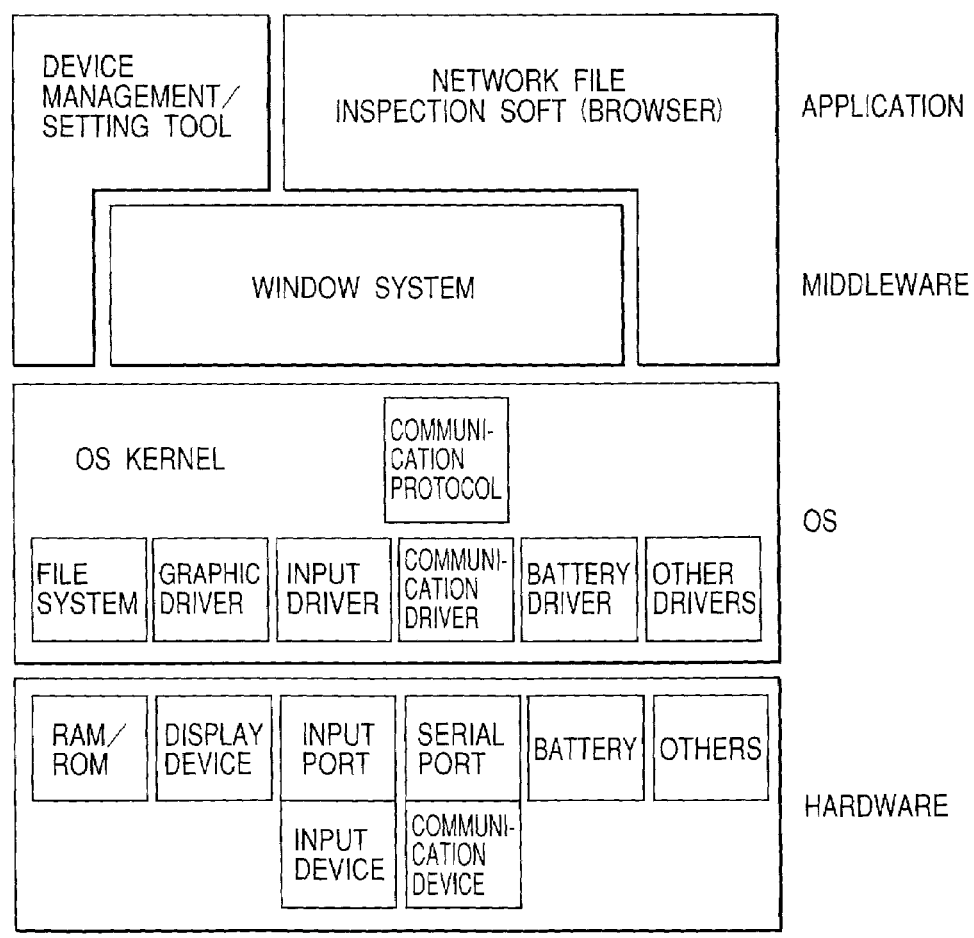
FIG. 2 is a conceptional view showing an example of software of the compact information terminal apparatus to which the present invention is applied.

The present invention will now be fully explained in connection with embodiments thereof with reference to the accompanying drawings.

First Embodiment

FIG. 1A is a block diagram showing a construction of hardware of a compact information terminal apparatus to which the present invention is applied.

The compact information terminal apparatus is of portable type and includes a CPU 11, a ROM 12 and a RAM 13. The ROM may be re-writable flash ROM. Further, the apparatus includes a display device 14 comprised of a liquid crystal panel and a back light, and the display device 14 is driven and controlled by a display control circuit 15. The display device has displaying performance equivalent to that of a personal computer. The back light may be omitted depending upon a kind of the display device. Other than this, the display device may be a display device of type capable of displaying a micro display in a magnification manner by using an optical system.

A communication device 16 and a communication control circuit 17 are connected to the CPU 11 via an I/O port. The communication device 16 includes a network adaptor for connection to a LAN, and a modem for connection to a WAN such as a telephone circuit. A connecting medium may include a wire cable, an infrared ray, a radio system and the like, and the present invention can be applied regardless of the kinds of the communication device, connecting medium and recipient. Further, the I/O port may be any one of various serial connecting systems and parallel connecting systems such as RS-232C or USB.

An input device 18 and an input control circuit 19 are also connected to the CPU 11 via an I/O port. The input device 18 has a function for designating at least four directions and a function for determining a present position of a cursor 34 (described later) as a designated position and is designed to be manipulated by one hand.

An example of the input device 18 is shown in FIG. 1B. In the input device 18, by depressing one of four ends of a key-top 110, input in "up", "down", "left" or "right" direction can be effected, and, when the entire key-top 110 is depressed, "determination" input can be effected. Incidentally, although not shown, below the key-top 110, there are disposed four switches corresponding to "up", "down", "left" or "right" directions.

Next, a software construction of the compact information terminal apparatus according to the present invention will be explained with reference to FIG. 2. Incidentally, the software is preset in the ROM 12 and is developed in the RAM 13 when executed by the CPU 11.

The software comprises OS, middleware and application. The OS is an incorporated real time OS for controlling the hardware and any kind of OS can be used.

The OS includes kernel, file system, device driver and communication protocol, and the device driver serves to control various devices such as display, communication and input devices and a battery. Further, the communication protocol is, for example, protocol such as PPP or TCP/IP for connection to an Internet, and the present invention can applied regardless of the kind of the protocol. Further, the middleware is a window system for describing a character and/or a figure on the view (picture plane), and the present invention can applied regardless of the kind of the window system.

A terminal control system inherent to the present invention can be realized by application software. A main form of the terminal control software is browser (inspection software) which is stored on a WWW server and serves to inspect a file such as HTML described by a description language. The terminal control software includes a communication portion, an HTML interpretation portion, a display view producing portion and an input processing portion. Among these portion, the present invention is characterized by the input processing portion, and the other portions can be realized by using a WWW browser technique which is widely utilized.

Next, a control command instructing system according to the first embodiment will be explained with reference to FIGS. 3A to 3C. This corresponds to specification of the input processing portion in the WWW browser.

Figure 3A:
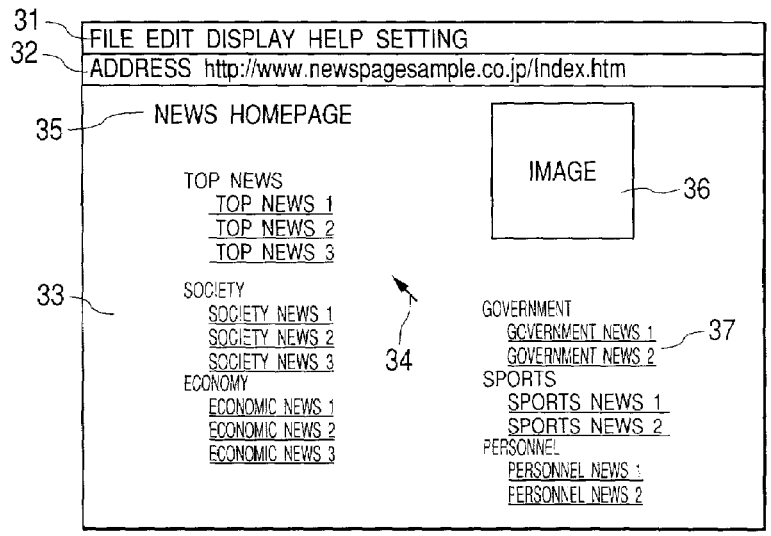
FIGS. 3A, 3B and 3C are views for explaining a displaying method of a button box on a browsing software view.

FIG. 3A shows an example of a view of the information terminal control software according to the illustrated embodiment. The view includes a command menu bar 31, a URL address display bar 32 and a contents display area 33, and the contents display area 33 includes characters 35 and an image 36 as contents. Further, a cursor 34 for designating a position on the view is also shown.

Here, a hyper link which is a link to other resource is distinguished from general characters, for example, by drawing the underline 37 therebelow, as is in characters. Further, when the cursor 34 is shifted into a link area, a shape of the cursor 34 is changed to inform the operator of the link. Of course, the link area can be designated in the image. Such a link area is generally referred to as a "hot spot". Such a representing methods for the link and the cursor is similar to that of the commercially available WWW browser.

Next, a method for operating the information terminal control software will be explained. Here, the operation of the information terminal control software is to issue or emit command for designating URL in which a file to be browsed exists, command for displaying a filed immediately previously browsed or command for reading-in a file being now browsed from the network again.

In the illustrated embodiment, by designating an area other than the hot spots, a button box mode is achieved, where a button box is popped-up and the command can be executed by selecting and designating a button corresponding to a desired operation in the button box.

Figure 3B:
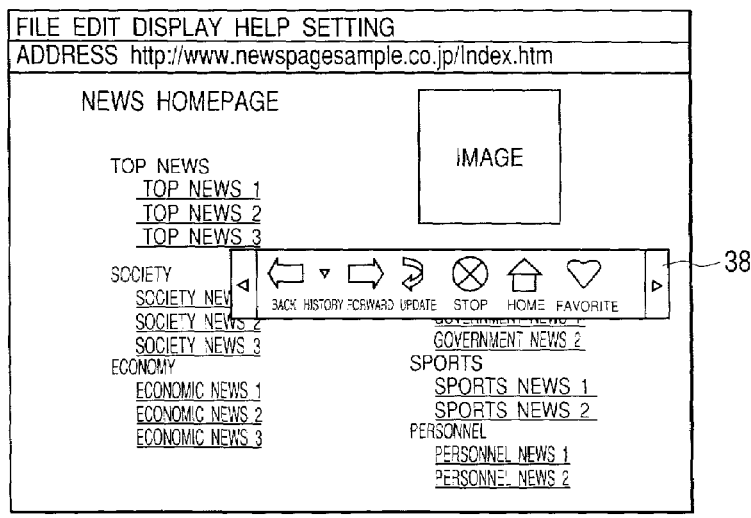
Figure 3C:
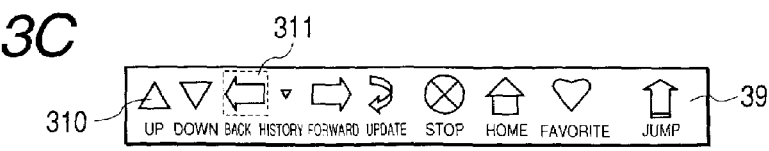

FIG. 3B shows a condition that the button box is popped-up when the cursor 34 is located at a position other than the hot spot as is in FIG. 3A. The popped-up button box is indicated by the reference numeral 38. Here, the pop-up instruction of the button box 38 is effected by so-called click operation in which a determining switch of the input device 18 is turned ON/OFF for a short time.

Depending upon the size of the view, since the entire button box 38 cannot be displayed, as shown by "38", the button box may be displayed only partially. The entire button box 39 is shown in FIG. 3C. Here, ten (in total) buttons are displayed. When the button box 38 or 39 is popped-up, the position of the cursor 34 is set on the first button displayed, for example, on a "back" button in the button box 38 shown in FIG. 3B, and the shape of the cursor is changed to a rectangular form encircling the entire button, as shown by the reference numeral 311 in FIG. 3C.

Further, normally, although the cursor 34 is smoothly shifted on the view from pixel to pixel, in the button box mode, the cursor is shifted jumpingly from button to button. For example, in a case where the rectangular cursor is positioned on an "update" button, when the "right" of the input device 18 is clicked, the cursor is shifted onto a "stop" button.

Figure 4A:
FIGS. 4A, 4B and 4C are views for explaining an operation of the button box.
Figure 4B:
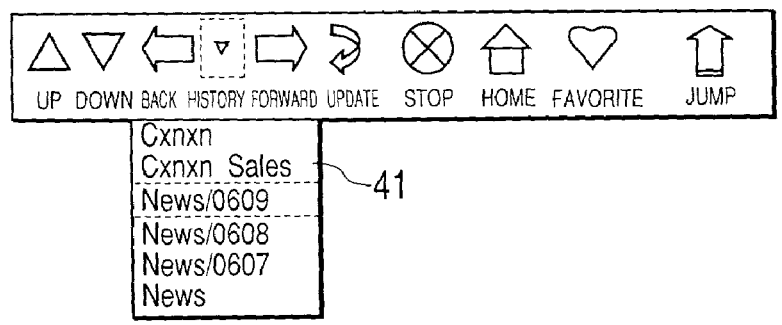
Figure 4C:
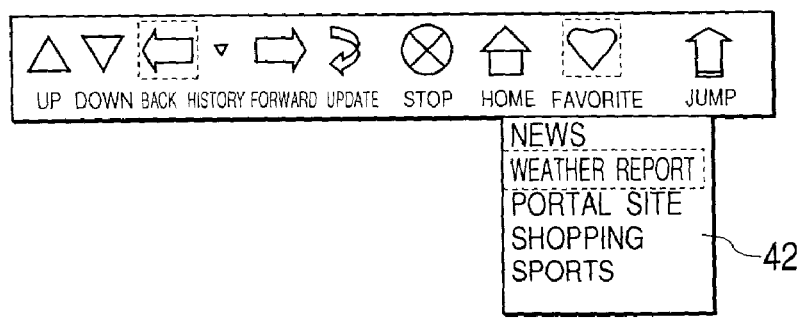

An example of processing in the button box mode will be further described with reference to FIGS. 4A to 4C. FIG. 4A shows the entire button box, where the rectangular cursor is located on the "back" button. The buttons included in the button box are named as, in order from the left, "up" (upward scroll), "down" (downward scroll), "back" (display of previous file in a history list), "history" (display of the history list), "forward" (display succeeding file in the history list), "update" (re-reading of the present URL), "stop" (temporary interruption of data reading), "home" (display of an initial home page), "favorite" (display of a list of bookmark) and "jump" (input of URL).

Among these buttons, the upward and downward scroll buttons serve to scroll the respective displayed areas while the determining switch of the input device 18 is being depressed, when the cursor is positioned on the button. Further, when the "back", "forward", "update", "stop" and "home" buttons are clicked, they issue respective commands, thereby performing corresponding processing operations.

When the "jump" button is clicked, a software keyboard for inputting the URL is displayed, and when the URL input is effected, the file corresponding to the URL is read-in and displayed. Although there are many software keyboards, since the present invention does not directly relate to the kind and inputting system of the software keyboard, explanation thereof will be omitted.

The "history" and "favorite" buttons serve to display the URL list. FIGS. 4B and 4C show examples of the URL list when the cursor is shifted onto the "history" and "favorite" buttons, respectively. A list 41 indicates, in order, URLs referred after the compact information terminal apparatus was started, and a list 42 indicates a list of URLs registered as the bookmark. By shifting the cursor from the button onto one of the listed URLs and by clicking the desired URL, the information of such URL can be displayed.

Figure 6:
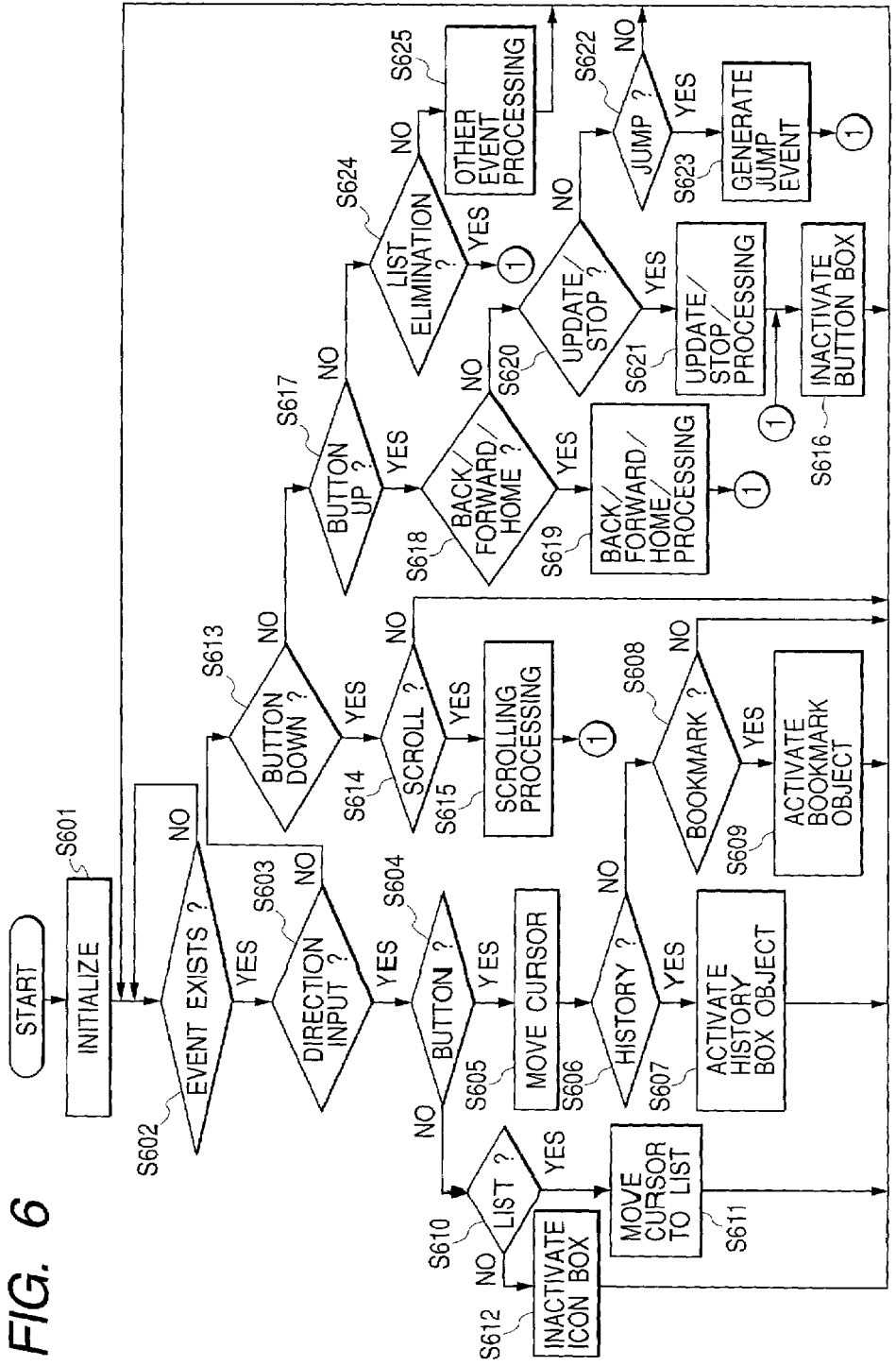
FIG. 6 is a flow chart showing an operation sequence of button box object.
Figure 7:
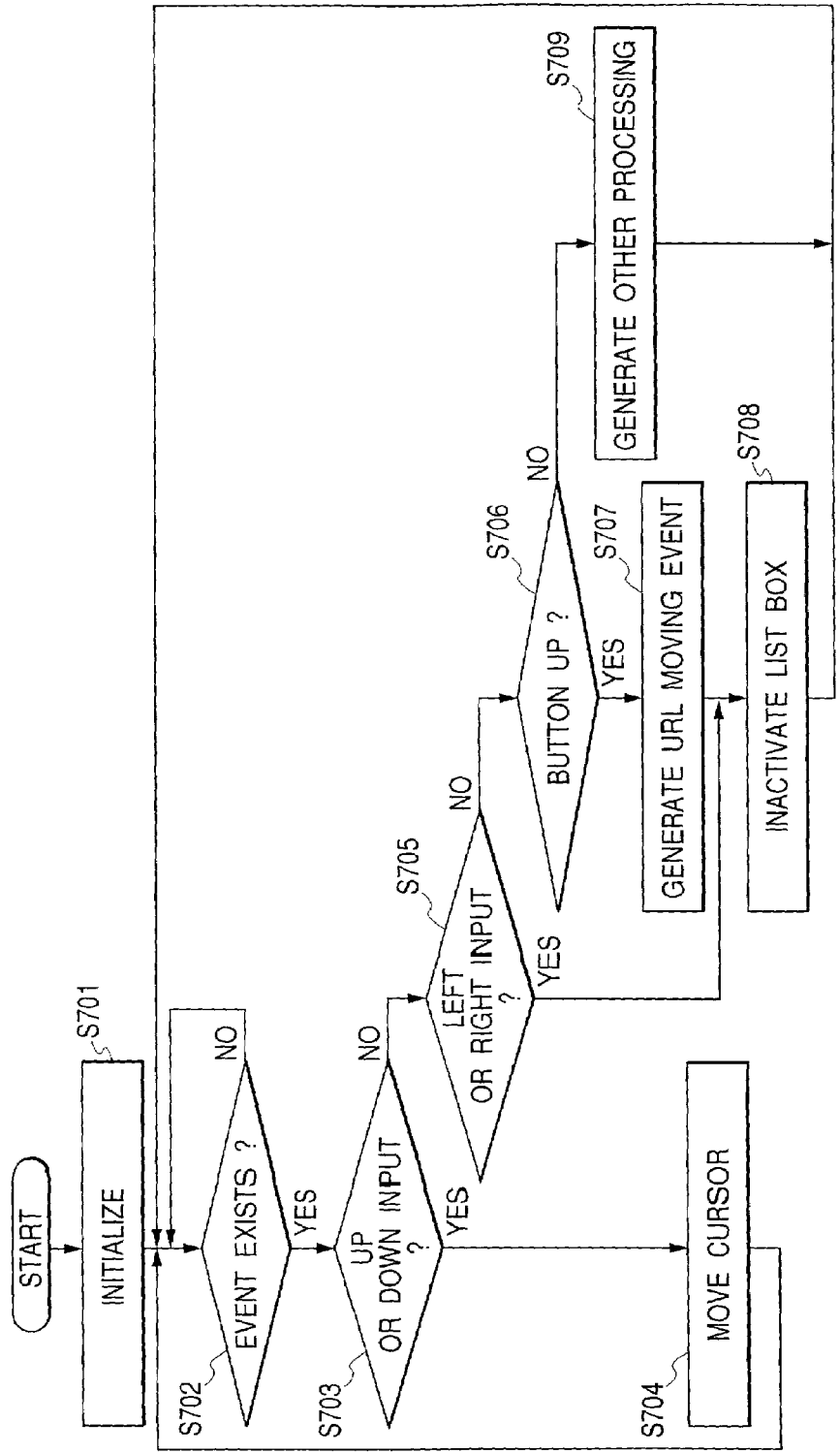
FIG. 7 is a flow chart showing an operation sequence of list box object.

Now, processing sequences for issuing the command through the button box will be described with reference to flow charts shown in FIGS. 5 to 7, mainly relating to processing operation of the button box object and list object. Although the execution of the program requires many objects such as main object of the program, object of the URL display bar and object of the menu bar, other than these objects, since the processing operations of other objects are not different from the browser of the commercially available personal computer, explanation thereof will be omitted.

Figure 5:
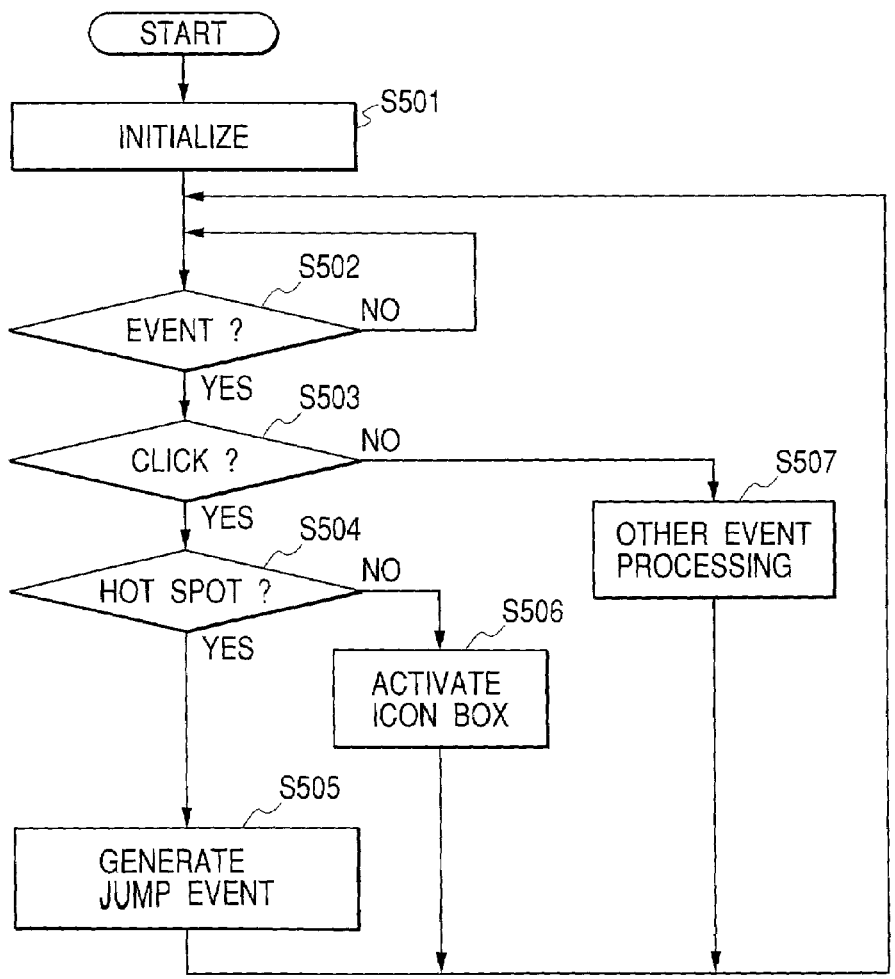
FIG. 5 is a flow chart showing an operation sequence of display view object in the first embodiment of the present invention.

FIG. 5 is a flow chart showing the processing of the display view object relating to the drawing area.

When the display view object is produced by the main object of the program and the like, in a step S501, the display view object is initialized. Then, in a step S502, the sequence enters to an event waiting loop. If the event is generated, the sequence goes to a step S503, where it is judged whether the generated event is the clicking operation of the input device 18 or not. If NO, the sequence goes to a step S507, where the processing corresponding to other event is effected and then the sequence returned to the event waiting loop of the step S502.

On the other hand, if the generated event is the clicking operation of the input device 18, the sequence goes to a step S504, where it is judged whether the present position of the cursor 34 is the hot spot position or not, i.e., whether the hot spot is designated or not. As a result, if a position other than the hot spot is designated, the sequence goes to a step S506, where an event for activating the button box in the vicinity of the designated position is generated and then the sequence returned to the event waiting loop of the step S502.

On the other hand, if the hot spot is designated, the sequence goes to a step S505, where an event for jumping to the URL of information relating to the hot spot and then the sequence returned to the event waiting loop of the step S502.

Next, the processing relating to the button box will be described with reference to the flow chart shown in FIG. 6.

When the button box object is generated, in a step S601, the button box object is initialized. Then in a step S602, the sequence goes to an event waiting loop. If the event is generated, in a step S603, it is judged whether the generated event is a direction input event or not. As a result, if the event is the direction input event, the sequence goes to a step S604, where there is a button in the designated direction. As a result, if there is the button in the designated direction, the sequence goes to a step S605, where the cursor 34 is shifted.

Then, the sequence goes to a step S606, where it is judged whether the cursor 34 is shifted onto the "history" button or not. As a result, if the "history" button, the history list object is activated and then the sequence returned to the event waiting loop of the step S602. On the other hand, if the cursor 34 is not sifted onto the "history" button, the sequence goes to a step S608, where it is judged whether the cursor 34 is shifted onto the "favorite (bookmark)" button or not. As a result, if the "favorite" button, the sequence goes to a step S609, where the bookmark list object is activated and the sequence returned to the event waiting loop of the step S602. Incidentally, the processing operations of the list objects will be described later.

In the step S604, if it is judged that there is no button designated, the sequence goes to a step S610, where it is judged whether there is URL list in the designated direction. As a result, if there is the URL list, the sequence goes to a step S611, where the cursor 34 is shifted in the direction of the URL list and then the sequence returned to the event waiting loop of the step S602.

On the other hand, if there is no URL list in the designated direction, i.e., if a direction along which the button or the URL list does not exist is designated, the sequence goes to a step S612, where the button box is deactivated to erase the button box and then the sequence returned to the event waiting loop of the step S602. Incidentally, once the button is deactivated, the event relating to the button box does not generated until the button box is activated again.

In the step S603, if it is judged that an event other than the direction input event is generated, the sequence goes to a step S613, where it is judged whether a determining button down event is generated, i.e., whether the determining switch of the input device 18 is turned ON. As a result, if the determining button down event is generated, the sequence goes to a step S614, where it is judged whether the cursor 34 is located on the scroll button.

As a result, if the cursor 34 is located on the scroll button, the sequence goes to a step S615, where the scrolling processing is effected. The scrolling processing is continued so long as the determining switch of the input device 18 is turned ON. When the scrolling processing is finished, the sequence goes to a step S615, where the button box is deactivated, similar to the step S612 and then the sequence returned to the event waiting loop of the step S602. On the other hand, in the step S614, if it is judged that the cursor is not located on the scroll button, the sequence returned to the event waiting loop of the step S602.

In the step S613, if it is judged that the generated event is not the determining button down event, the sequence goes to a step S617, where it is judged whether the generated event is a determining button up event, i.e., whether the determining switch of the input device 18 is turned OFF. As a result, if the generated event is the determining button up event, the sequence goes to a step S618, where it is judged whether the cursor is located on any one of "back", "forward" and "home" buttons. As a result, if the cursor is located on any one of "back", "forward" and "home" buttons, the sequence goes to a step S619, where the processing corresponding to the button as mentioned above is effected, and, in the step S616, the button box is deactivated to erase the button box and then the sequence returned to the event waiting loop of the step S602.

On the other hand, if the cursor is not located on any one of "back", "forward" and "home" buttons, the sequence goes to a step S620, where it is judged whether the cursor is located on the "update" or "stop" button. As a result, if the cursor is located on the "update" or "stop" button, the sequence goes to a step S621, where the updating operation of the URL or stop processing of reading-in of the file being now read is effected.

On the other hand, if the cursor is not located on the "update" or "stop" button, the sequence goes to a step S622, where it is judged whether the cursor is located on the "jump" button. As a result, if the cursor is located on the "jump" button, the sequence goes to a step S623, where the URL is inputted by using the software keyboard and the HTML file of the inputted URL is down-loaded to update the display. After the processing in the step S612 or step S623 is finished, the sequence goes to the step S616, where the button box is deactivated and then the sequence returned to the event waiting loop of the step S602.

In the step S622, it is judged that the cursor is not located on the "jump" button, since no command exist, the sequence returned to the event waiting loop of the step S602.

In the step S617, if it is judged that the generated event is not the determining button up event, in a step S624, it is judged whether the generated event is a list elimination event. The generation of the list elimination event indicates the fact that the URL list such as "history" or "favorite" is shifted out of the URL list of the cursor or is deactivated (display-erased) by the completion of the jump processing. In this case, the button box is also deactivated. That is to say, the sequence is returned to the step S616 to inactivate the button box and then the sequence returned to the event waiting loop of the step S602.

On the other hand, in the step S624, if it is judged that the generated event is not the list elimination event, the sequence goes to a step S625, where other event processing is performed. Such event processing is event processing to be effected by the parent object and the like.

Next, processing of the list box object will be explained with reference to FIG. 7. When the list box object is generated, in a step S701, the list box object is initialized, and, in a step S702, the sequence goes to an event waiting loop.

If the event is generated, in a step S703, it is judged whether the generated event is an up or down input event.

As a result, if the generated event is the up or down input event, in a step S704, the cursor 34 is shifted. Here, if the cursor 34 is located on an uppermost item in the URL list, the cursor 34 is shifted onto a lowermost item in the URL list. Similarly, if the cursor 34 is located on the lowermost item in the URL list, the cursor 34 is shifted onto the uppermost item in the URL list.

In the step S703, if it is judged that an event other than the up or down input event is generated, in a step S705, it is judged whether a left or right input event is generated. As a result, if the left or right input event is generated, the sequence goes to a step S708, where the list box is deactivated. That is to say, an event indicating elimination and deactivation of the display of the list box is issued to the button box object.

In the step S705, it is judged that the generated event is not the left or right input event, the sequence goes to a step S706, where it is judged whether the generated event is the determining button up event. As a result, if the determining button up event is generated, since it means the fact that the URL is designated, the sequence goes to a step S707, where an event for shifting the cursor 34 onto the designated URL is generated. Consequently, other object for effecting the actual communication processing reads in the file existed in the designated URL. And, in the step S708, the list box is deactivated and then the sequence returned to the event waiting loop of the step S702.

In the step S706, it is judged that the generated event is not the determining button up event, the sequence goes to a step S709, where other event processing is effected and then the sequence returned to the event waiting loop of the step S702.

In this way, according to the illustrated embodiment, in the compact information terminal apparatus including the display device having displaying function equivalent to that of the personal computer, when the position other than the hot spot is designated on the browsing view of the HTML document by the input device 18, since the button box including plural buttons embodies as figures of commands for operating the HTML document browsing software is displayed in the vicinity of the designated position, the browsing software for browsing the HTML document can easily be manipulated without altering the HTML document formed for the personal computer.

Further, since the input device 18 can be manipulated by one hand, the browsing software can similarly be manipulated easily. In addition, since the shape of the cursor is changed and the cursor is shifted from button to button, the browsing software can similarly be manipulated easily.

Second Embodiment

In a second embodiment of the present invention, when the button box of the first embodiment is pop-up displayed, another event is used. More specifically, in the network file displaying area, if a predetermined time period is elapsed while the determining button of the input device 18 is being depressed, i.e., while the determining switch is being turned ON, the button box is popped-up. An operation for designating the hot spot is a clicking operation, as is in the conventional cases. Accordingly, the operator can start the button box without ascertaining whether the cursor 34 is located on the hot spot or not.

Now, only the starting processing of the button box in the display view object different from the first embodiment will be explained with reference to FIG. 8.

Figure 8:
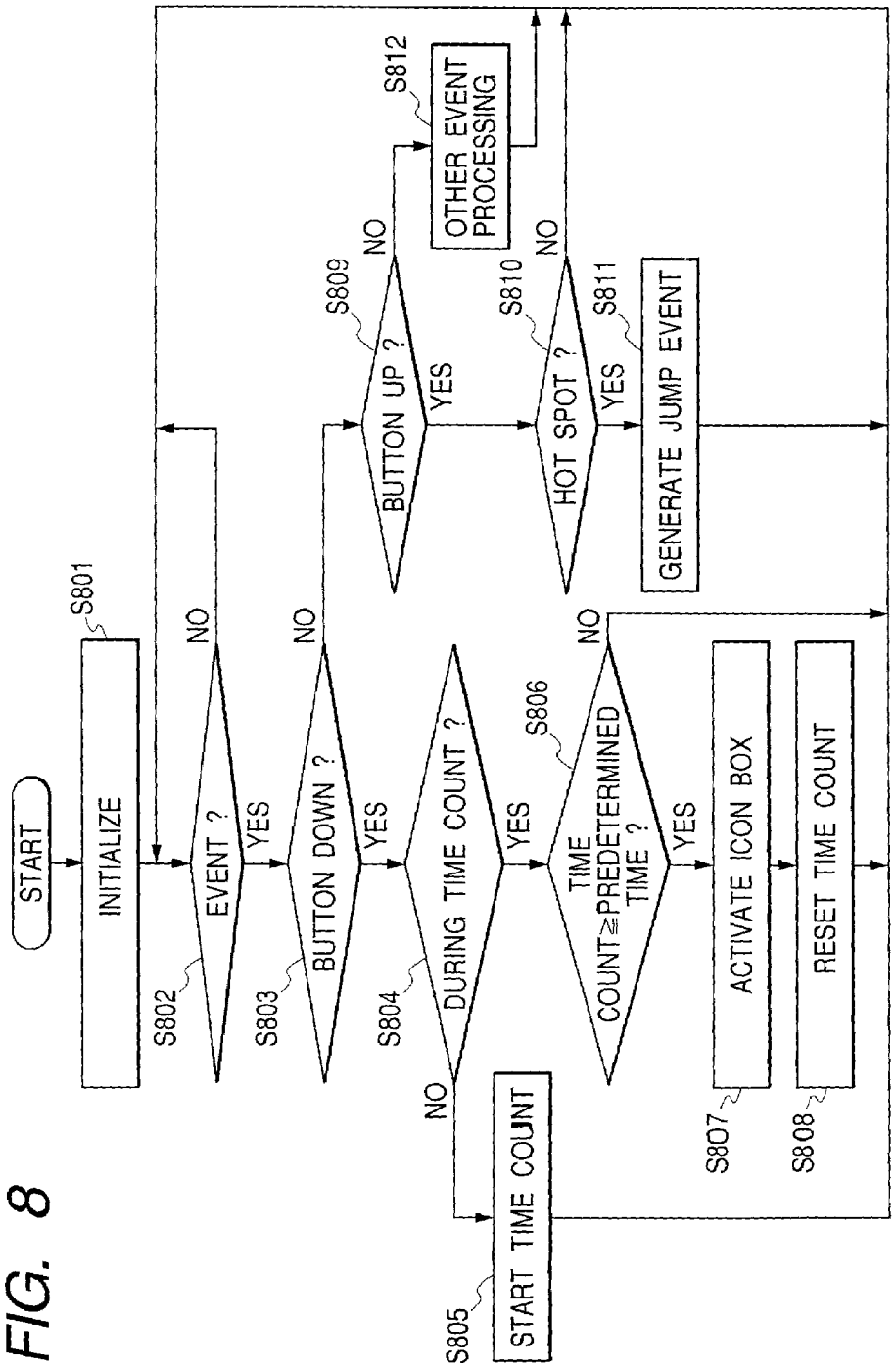
FIG. 8 is a flow chart showing an operation sequence of display view object according to a second embodiment of the present invention.
Figure 9:
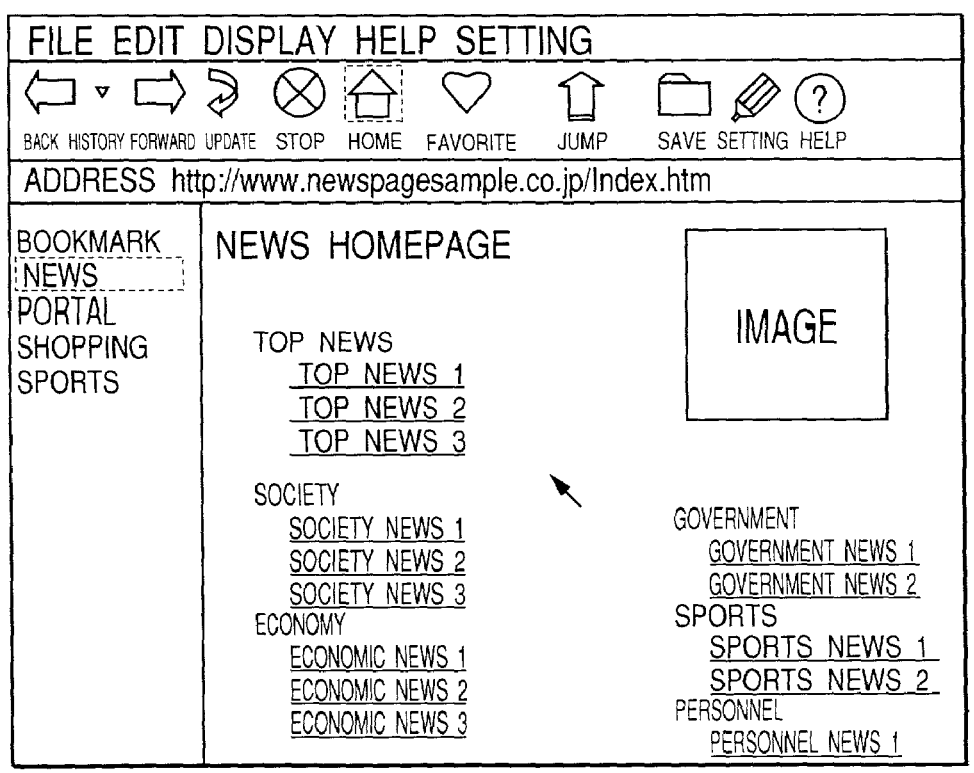
FIG. 9 is a view showing an example of a conventional browsing software view.

In FIG. 8, when the display view object is generated by the main object of the program and the like, in a step S801, the display view object is initialized. Then, in a step S802, the sequence enters to an event waiting loop.

If the event is generated, the sequence goes to a step S803, where it is judged whether the generated event is the determining button down event, i.e., the determining switch of the input device 18 is turned ON. As a result, if the determining switch is turned ON, the sequence goes to a step S804, where it is judged whether time is now counted. As a result, if the time is not being counted, counting of the time is started by starting a timer and then the sequence is returned to the event waiting loop of the step S802.

On the other hand, if the time is now being counted, the sequence goes to a step S806, where it is judged whether a predetermined time period is elapsed after the counting of the time is started (i.e., after the determining switch is turned ON). As a result, if the predetermined time period is elapsed, the sequence goes to a step S807, where the button box is activated at the present position of the cursor 34. And, in a step 808, the counting of the time is finished by resetting the timer and then the sequence is returned to the event waiting loop of the step S802.

In the step S806, if it is judged that the predetermined time period is not elapsed, the steps S807 and S808 are skipped, and the sequence is returned to the event waiting loop of the step S802.

In the step S803, if it is judged that the determining switch is not turned ON, the sequence goes to a step S809, where it is judged whether the generated event is the determining button up event, i.e., whether the determining switch of the input device 18 is turned OFF. As a result, if the determining switch is turned OFF, the sequence goes to a step S810, where it is judged whether the cursor 34 is located on the hot spot. As a result, if the cursor 34 is located on the hot spot, the sequence goes to a step S811, where the jump event is generated to jump to the URL of information relating to the hot spot designated by the cursor 34.

On the other hand, if the cursor 34 is not located on the hot spot, the sequence is returned to the event waiting loop in the step S802. In the step S809, if it is judged that the determining switch is not turned OFF, the sequence goes to a step S811, where other event processing is effected and then the sequence is returned to the event waiting loop of the step S802.

By the above-mentioned processing, even when the cursor 34 is located at any position on the display area, only by continuing to turn the determining switch ON, immediately when the predetermined time period is elapsed after the determining switch is turned ON, the button box can be displayed. Further, when the clicking operation is effected on the hot spot, as is in the conventional cases, the jump processing to the related information is effected.

Accordingly, the operator can display, as quickly as possible, the button box for manipulating the browser without ascertaining whether the present position of the cursor 34 is on the hot spot.

Incidentally, the present invention is not limited to the above-mentioned embodiments, but, for example, the present invention can be applied to a browser for a hyper text other than the HTML document.

As mentioned above, according to the present invention, in the compact information terminal apparatus including the display means having displaying function equivalent to that of the personal computer, the browsing software for browsing the hyper text can easily be manipulated without altering the hyper text formed for the personal computer.

Third Embodiment

The present invention can be realized by using an input device other than those in the first and second embodiments.

Figure 10A:
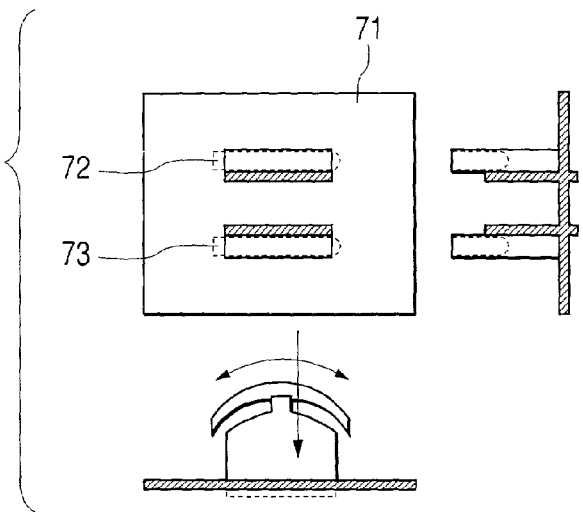
FIGS. 10A and 10B are constructional views showing an input device according to a third embodiment of the present invention.

FIG. 10A shows an input device in which two shuttle switches 72 and 73 are arranged side by side on a substrate 71. The shuttles 72, 73 of the input device can be operated by a left/right lever operation and a center pushing operation, and the lever is designed to be subjected to an inertia force so that, when the lever is released from the operator's hand, it can be returned to a central position. Thus, one shuttle switch can perform a two-direction inputting function and a determination inputting function.

In FIG. 10A, for example, the shuttle switch 72 is used for left or right inputting and the shuttle switch 73 is used for up or down inputting. Further, the determining operation can be realized by pushing either one of the shuttle switches 72, 73. Any combination of the shuttle switches 72, 73 and up or down inputting and left or right inputting can be designated freely. Further, the determining input may be effected by using either one of the shuttle switches 72, 73. In either system, four direction (up, down left, right) inputting function and determination inputting function can be realized.

Since the shuttle switches can designate only the direction, the position control of the cursor 44 is effected in an input device circuit and a device driver. For example, a switching circuit may be disposed between a pulse generating circuit and a counter circuit so that, while the shuttle switch is being laid down, the counting is effected by the counter circuit to increase or decrease a shifting distance of the cursor 34.

Figure 10B:
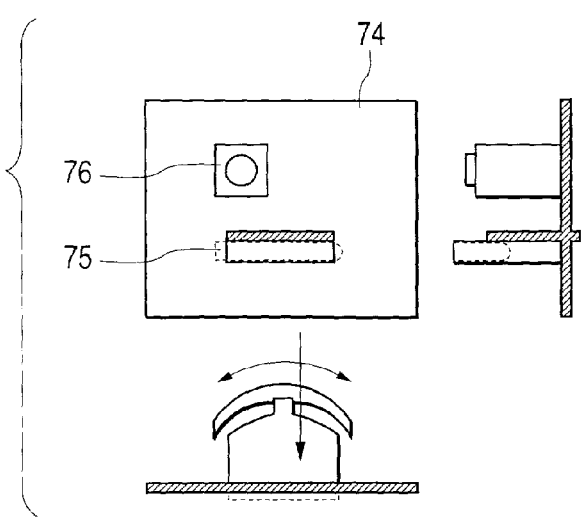

FIG. 10B shows an example of an input device in which one shuttle switch 75 and one tact switch 76 are used. The shuttle switch 75 may be one of the shuttle switches 72, 73 of FIG. 10A. In this case, for example, left or right inputting and determination inputting are effected by the shuttle switch 75, and up or down inputting is effected by manipulating the shuttle switch 75 while depressing the tact switch 76. Alternatively, up or down inputting and determination inputting are effected by the shuttle switch 75, and left or right inputting is effected by manipulating the shuttle switch 75 while depressing the tact switch 76. Further, the position control of the cursor 34 can be effected by using an input device circuit and a device driver similar to those used in the input device of FIG. 10A.

In the illustrated embodiment, arrangement of the shuttle switch and the tact switch can be selected freely, and they can be arranged on the same substrate at positions different from those in FIG. 10A or they can arranged on different substrates.

In this way, in the illustrated embodiment, by constituting the input device by using the shuttle switches having push function and/or tact switch, the input device which can be manipulated by one hand can be realized.

Fourth Embodiment

The present invention can be realized by using an input device different from those in the first to third embodiments.

Figure 11A:
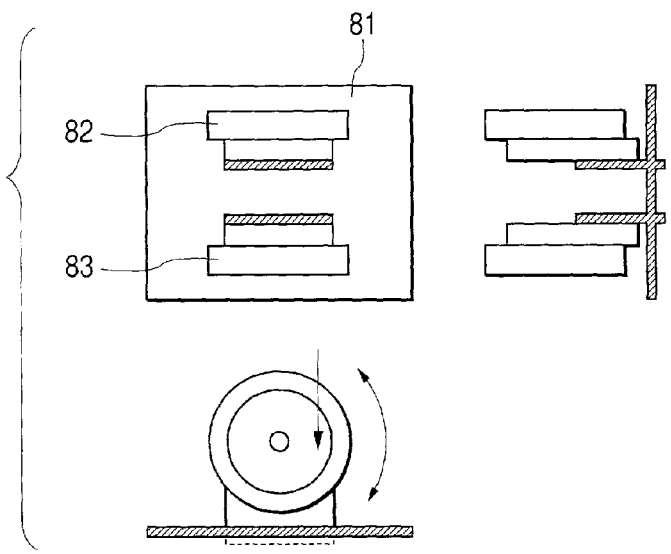
FIGS. 11A and 11B are constructional views showing an input device according to a fourth embodiment of the present invention.

FIG. 11A shows an example of an input device in which two encoders 82, 83 having push function are disposed side by side on a substrate 81. Two direction inputting function and a determination inputting function can be realized by one encoder.

In FIG. 11A, for example, the encoder 82 is used for left or right inputting and the encoder 83 is used for up or down inputting. Further, the determining operation can be realized by pushing either one of the encoders 82, 83. Any combination of the encoders 82, 83 and up or down inputting and left or right inputting can be designated freely. Further, the determining input may be effected by pushing either one of the encoders 82, 83. In either system, four direction (up, down left, right) inputting function and determination inputting function can be realized.

The encoders 82, 83 output two rectangular waves, and phase difference between the rectangular waves are reversed in dependence upon a rotational direction. Thus, by inputting the rectangular waves in a counter circuit, the position can be measured.

Figure 11B:
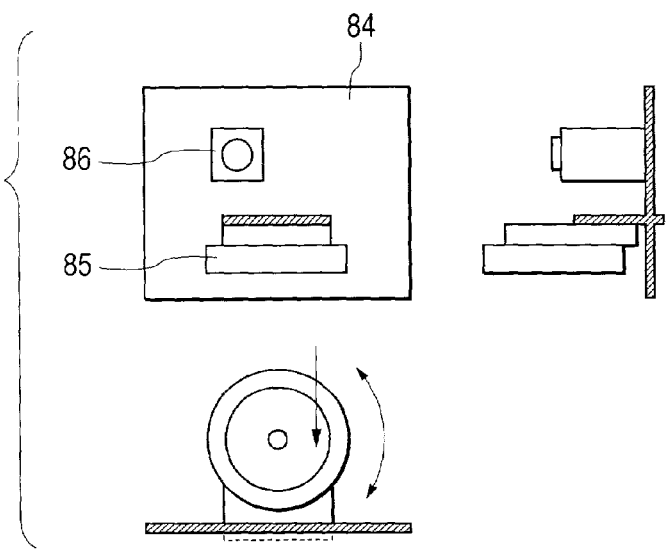

FIG. 11B shows an example of an input device in which one encoder 85 and one tact switch 86 are used. The encoder 85 may be one of the encoders 82, 83. In this case, for example, left or right inputting and determination inputting are effected by the encoder 85, and up or down inputting is effected by manipulating the encoder 85 while depressing the tact switch 86. Alternatively, up or down inputting and determination inputting are effected by the encoder 85, and left or right inputting is effected by manipulating the encoder 85 while depressing the tact switch 86. Further, the position control of the cursor 34 can be recognized by using an input device circuit and a device driver similar to those used in the input device of FIG. 11A.

In the illustrated embodiment, arrangement of the rotatable encoder and the tact switch can be selected freely, and they can be arranged on the same substrate at positions different from those in FIG. 11A or they can arranged on different substrates.

In this way, in the fourth embodiment, by constituting the input device by using the encoders having push function and/or tact switch, the input device which can be manipulated by one hand can be realized.

As mentioned above, according to the present invention, in the compact information terminal apparatus including the display means having displaying function equivalent to that of the personal computer, the browsing software for browsing the HTML document can easily be manipulated without altering the HTML document formed for the personal computer.

What is claimed is:

1. An information terminal apparatus having a browser which browses structured data which includes reference information, comprising:
 a position designator which moves a pointer on a display view of the structured data and designates a position of the pointer; and
 a controller which refers to a linked destination of the reference information in the case that the position designated by said position designator is a display position of the reference information of the structured data, which displays instruction information for operating said browser and a display area of the instruction information in the case that the position designated by said position designator is a position other than the display position of the reference information of the structured data, and which undisplays the instruction information and the display area in the case that the pointer moves outside of the display area.

2. An information terminal apparatus according to claim 1, wherein said position designator includes a plurality of switches to which a function for instructing shifting directions of the pointer on the display view and a function for determining a present position of the pointer as the designated positions are assigned, and said controller displays the instruction information for operating said browser in the vicinity of the present position of the pointer when a designated position is a position other than the display position of the reference information.

3. An information terminal apparatus according to claim 1, wherein the instruction information includes a group of buttons embodied as figures for operating instructions, and an operating instruction corresponding to each button is executed in response to designating one of said buttons by said position designator.

4. An information terminal apparatus according to claim 1, wherein a shape of the pointer moved by said position designator is changed between a display area of the instruction information and the other areas.

5. An information terminal apparatus according to claim 3, wherein the pointer is shifted from button to button in the group of buttons area and is shifted from pixel to pixel in the areas other than the group of buttons area.

6. An information terminal apparatus according to claim 3, wherein the group of buttons includes at least one button for scrolling the display view in an up or down direction, a button for displaying a history list, a button for displaying a preceding file, a button for displaying a succeeding file in the history list, a button for reading-in a present URL again, a button for temporarily interrupting the reading-in, a button for displaying an initial home page, a button for displaying a list of bookmarks, and a button for inputting a URL.

7. An information terminal apparatus according to claim 1, wherein said position designator includes one shuttle switch for instructing an up or down shifting direction of the pointer on die display view and one shuttle switch for instructing a left or right shifting direction of the pointer, and a function for determining a present position of the cursor as the designated position is assigned to at least one of said shuttle switches.

8. An information terminal apparatus according to claim 1, wherein said position designator includes one shuttle switch to which a function for instructing shifting directions of the pointer on the display view and a function for determining a present position of the pointer as the designated position are assigned, and one tact switch which switches the shifting directions by the shuffle switch.

9. An information terminal apparatus according to claim 1, wherein said position designator includes one encoder for inputting a shifting amount of the pointer in an up or down direction on the display view, and one encoder for inputting a shifting amount of the pointer in a left or right direction, and a function for determining a present position of the pointer as the designated position is assigned to at least one of said encoders.

10. An information terminal apparatus according to claim 1, wherein said position designator includes one encoder to which a function for instructing shifting directions of the pointer on the display view and a function for determining a present position of the pointer as the designated position are assigned, and one tact switch which switches the shifting directions by the encoder.

11. A method for controlling an information terminal apparatus having a browser which browses structured data which includes reference information, comprising:

a position discriminating step of discriminating a position of a pointer designated on a display view of the structured data; and a controlling step of selectively referring to a linked destination of the reference information of the structured data corresponding to the position discriminated in said position discriminating step, displaying instruction information for operating said browser and a display area of the instruction information, or undisplaying the instruction information and the display area, in accordance with the discriminated position in said position discriminating step.

12. A method according to claim 11, wherein said controlling step displays the instruction information for operating said browser in the vicinity of the present position of the pointer.

13. A method according to claim 11, wherein the instruction information includes a group of buttons embodied as figures for operating instructions, and an operating instruction corresponding to each button is executed in response to designating one of said buttons.

14. A method according to claim 11, wherein a shape of the pointer is changed between a display area of the instruction information and the other areas.

15. A method according to claim 13, wherein the pointer is shifted from button to button in the group of buttons area and is shifted from pixel to pixel in the areas other than the group of buttons area.

16. A method according to claim 13, wherein the group of buttons includes at least one button for scrolling the display view in an up or down direction, a button for displaying a history list, a button for displaying a preceding file, a button for displaying a succeeding file in the history list, a button for reading-in a present URL again, a button for temporarily interrupting the reading-in, a button for displaying an initial home page, a button for displaying a list of bookmarks, and a button inputting a URL.

17. A computer-readable medium storing computer-executable program instructions applicable to an information terminal apparatus which hosts a browser for browsing structured data which includes reference information, the program instructions comprising:

a position discriminating routine for discriminating a position of a pointer designated on a display view of the structured data; and a controlling routine for selectively referring to a linked destination of the reference information of the structured data corresponding to the position discriminated in said position discriminating routine, displaying instruction information for operating said browser and a display area of the instruction information, or undisplaying the instruction and the display area, in accordance with the position discriminated in said position discriminating routine.

18. A medium according to claim 17, wherein said controlling routine displays the instruction information for operating said browser in the vicinity of the present position of the pointer.

19. A medium according to claim 17, wherein the instruction information includes a group of buttons embodied as figures for operating instructions, and a operating instruction corresponding to each button is executed in response to designating one of said buttons.

20. A medium according to claim 17, wherein a shape of the pointer is changed between a display area of the instruction information and the other areas.

21. A medium according to claim 20, wherein the pointer is shifted from button to button in the group of buttons area and is shifted from pixel to pixel in the areas other than the group of buttons.

22. A medium according to claim 19, wherein the group of buttons includes at least one button for scrolling the display view in an up or down direction, a button for displaying a history list a button for displaying a preceding file, a button for displaying a succeeding file in the history list, a button for reading-in a present URL again, a button for temporarily interrupting the reading-in, a button for displaying an initial home page, a button fin displaying a list of bookmarks, and a button for inputting a URL.

* * * * *

UNITED STATES PATENT AND TRADEMARK OFFICE
CERTIFICATE OF CORRECTION

PATENT NO. : 7,113,168 B2  Page 1 of 1
APPLICATION NO. : 09/948633
DATED : September 26, 2006
INVENTOR(S) : Takashi Oya et al.

It is certified that error appears in the above-identified patent and that said Letters Patent is hereby corrected as shown below:

COLUMN 1:
Line 40, "drowsing" should read -- browsing --.

COLUMN 2:
Line 26, "back ground," should read -- background, --.

COLUMN 4:
Lines 3 and 7, "can" should read -- can be --; and
Line 17, "these portion," should read -- these portions, --.

COLUMN 6:
Line 34, "sifted" should read -- shifted --; and
Line 55, "does" should read -- is --.

COLUMN 12:
Line 37 claim 7, "die" should read -- the --.

COLUMN 14:
Line 20 claim 19, "a operating" should read -- an operating --; and
Line 34 claim 22, "list" should read -- list, --.

Signed and Sealed this

Eighteenth Day of March, 2008

JON W. DUDAS
*Director of the United States Patent and Trademark Office*